United States Patent [19]

Nohira et al.

[11] 4,442,809

[45] Apr. 17, 1984

[54] COMBUSTION CHAMBER OF AN INTERNAL COMBUSTION ENGINE WITH AN ACCUMULATION CHAMBER

[75] Inventors: Hidetaka Nohira, Mishima; Sumio Ito, Susono; Hisashi Oki, Numazu, all of Japan

[73] Assignee: Toyota Jidosha Kogyo Kabushiki Kaisha, Toyota, Japan

[21] Appl. No.: 241,610

[22] Filed: Mar. 9, 1981

Related U.S. Application Data

[63] Continuation of Ser. No. 22,491, Mar. 21, 1979, abandoned.

[30] Foreign Application Priority Data

Jan. 24, 1978 [JP] Japan ................................ 53-5816

[51] Int. Cl.³ ............................................ F02D 15/04
[52] U.S. Cl. .................................................. 123/316
[58] Field of Search .............. 123/292, 316, 308, 432, 123/64, 292

[56] References Cited

U.S. PATENT DOCUMENTS

| | | | |
|---|---|---|---|
| 1,648,929 | 11/1927 | Zaikowsky | 123/316 |
| 1,882,971 | 10/1932 | Schimanek | 123/64 |
| 3,785,355 | 1/1974 | Toepel | 123/316 |
| 3,916,852 | 11/1975 | Sakurai et al. | 123/274 |
| 4,103,648 | 8/1978 | Jarry | 123/316 |
| 4,191,135 | 3/1980 | Nohira et al. | 123/308 |
| 4,192,265 | 3/1980 | Amano et al. | 123/432 |
| 4,210,105 | 7/1980 | Hohira et al. | 123/316 |

*Primary Examiner*—Craig R. Feinberg
*Assistant Examiner*—W. R. Wolfe
*Attorney, Agent, or Firm*—Kenyon & Kenyon

[57] ABSTRACT

An internal combustion engine comprises a cylinder block and a cylinder head. A combustion chamber is formed in the cylinder block and the cylinder head. An accumulation chamber is formed within the cylinder head and communicated with the combustion chamber via an operating valve. The accumulation chamber is disposed adjacent to an exhaust port of the engine and is heat exchangeable with the exhaust port. The operating valve is opened approximately at the time the compression stroke is commenced and is closed approximately at the time the compression stroke is completed. A cap is disposed at the entrance of the accumulation chamber and has a plurality of jets formed thereon. The compressed combustible gas mixture is accumulated within the accumulation chamber, heated by the heat transmitted from the exhaust port and spouted out into the combustion chamber, so that approximately uniform turbulences are generated in the combustion chamber and the flame speed is increased.

4 Claims, 7 Drawing Figures

COMBUSTION CHAMBER OF AN INTERNAL COMBUSTION ENGINE WITH AN ACCUMULATION CHAMBER

This is a continuation of application Ser. No. 022,491 filed Mar. 21, 1979 and now abandoned.

TECHNICAL FIELD OF THE INVENTION

This invention relates to a combustion chamber of an internal combustion engine; more particularly, it relates to a combustion chamber of a gasoline engine or a diesel engine of the four-stroke cycle type.

BACKGROUND ART OF THE INVENTION

In the operation of the modern internal combustion engine there are two major areas which require improvement; that is, (i) reduction of harmful contaminants, such as hydrocarbon (HC), carbon monoxide (CO) and oxides of nitrogen ($NO_x$), in the exhaust gas emitted from the engine, and (ii) increase of the thermal efficiency of the engine.

Many methods are known for efficiently purifying harmful contaminants in exhaust gas emitted from an internal combustion engine. For example, there are known a method in which the above-mentioned three harmful contaminants (HC, CO and $NO_x$) are simultaneously reduced by introducing a lean air-fuel mixture into the combustion engine, and a method in which a large amount of exhaust gas is recirculated into the intake system of the combustion engine so as to reduce the contaminant $NO_x$. However, with either of these known methods there occurs a common problem in that the burning velocity of the air-fuel mixture is low and a high thermal efficiency cannot be obtained because the flame speed of such a mixture is very low. As a result, a satisfactorily high output of an engine cannot be obtained. Consequently, in the case wherein such a combustible gas mixture is used in an internal combustion engine, in order to improve the thermal efficiency of the engine, the most important factor is to increase the flame speed.

The inventors of the present invention have proposed in U.S. Pat. No. 4,191,135 which issued on Mar. 4, 1980 internal combustion engines which have combustion chambers wherein the flame speed of the combustible gas mixture can be increased.

One of the proposed engines comprises:

a cylinder block having a cylindrical bore formed therein for constituting a part of a combustion chamber in which a piston is reciprocated and a combustible mixture is burnt to generate engine power;

a cylinder head secured to the cylinder block, which head has a recess formed thereon for constituting the other part of the combustion chamber and a cavity formed therein for constituting an accumulation chamber, the accumulation chamber temporarily accumulating a part of the gas introduced into the combustion chamber; and a valve positioned on a passage for communicating the combustion chamber with the accumulation chamber, which valve is opened approximately at the time the compression stroke of the engine is commenced and is closed approximately at the time the compression stroke is completed. The internal combustion engine according to the copending application bearing U.S. Ser. No. 969,797, now abandoned, further comprises a plurality of jets for spouting gas accumulated in the accumulation chamber, which jets are disposed in the passage communicating the accumulation chamber with the combustion chamber, whereby turbulences are generated by the gas spouted through the jets in various portions of the compressed gas within the combustion chamber. It should be noted that in these inventions the valve positioned on the passage is closed at a time which is different from the time when the valve disclosed in U.S. Pat. No. 1,648,929 is closed. It should also be noted that unburnt intake gas is accumulated within the accumulation chamber disclosed in the copending applications instead of the burnt gas disclosed in U.S. Pat. No. 1,648,929.

SUMMARY OF THE INVENTION

The principal object of the present invention is to provide an internal combustion engine which is improved over the above-mentioned previously proposed engines.

Another object of the present invention is to provide an internal combustion engine wherein an accumulation chamber is disposed adjacent to an exhaust port of the engine so that heat exchange between the accumulation chamber and the exhaust port can be carried out. As a result, the movement of fuel molecules in the intake gas and the atomization and the vaporization of the fuel in the accumulation chamber are increased, and the fuel can be ignited easily, because the intake gas is heated by heat transmitted from the exhaust port into the accumulation chamber. In addition, pressure decrease of the intake gas accumulated in the accumulation chamber due to cooling of the intake gas can be prevented because the intake gas in the accumulation chamber is heated by heat transmitted from the exhaust port. In some cases, the pressure in the accumulation chamber is increased due to the heating of the accumulated intake gas; as a result, the intake gas strongly spouts into the combustion chamber from the accumulation chamber so that a strong swirl motion is generated within the combustion chamber and the intensity of the turbulence is increased.

In an embodiment of the present invention, an internal combustion engine is provided wherein the accumulation chamber has a passage for reciprocating the intake gas therein. The passage for effecting reciprocation is disposed substantially in parallel with the exhaust port whereby the intake gas introduced within the passage for reciprocation is heated by heat transmitted from the exhaust port and whereby the intake gas is flowed at a high speed within the passage for reciprocation when the intake gas flows into or flows from the accumulation chamber. As a result, not only the above-mentioned atomization and vaporization of the fuel in the intake gas due to the heating of the intake gas within the accumulation chamber and the pressurization of the accumulated intake gas caused by the heating of the intake gas are caused, but the atomization and the vaporization of the fuel in the accumulated intake gas due to the reciprocating movement of the intake gas within the reciprocating passage are also caused. As a result, generation of the swirl motion and turbulences in the combustion chamber can be increased.

Some embodiments of the present invention will now be explained with reference to the attached drawings.

DISCLOSURE OF THE INVENTION

Figure 1:
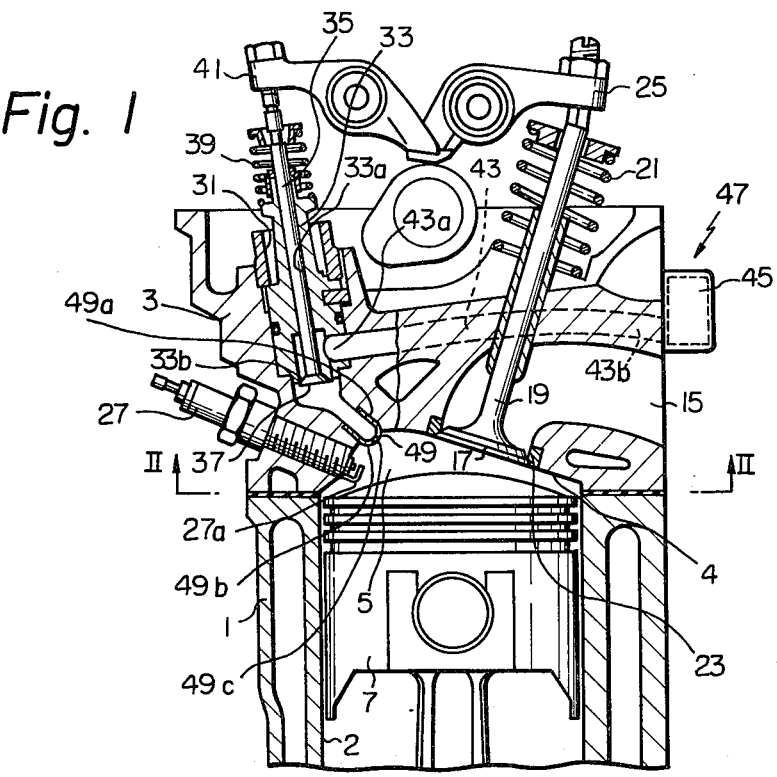
FIG. 1 is a cross-sectional elevational view of the first embodiment according to the present invention.
Figure 2:
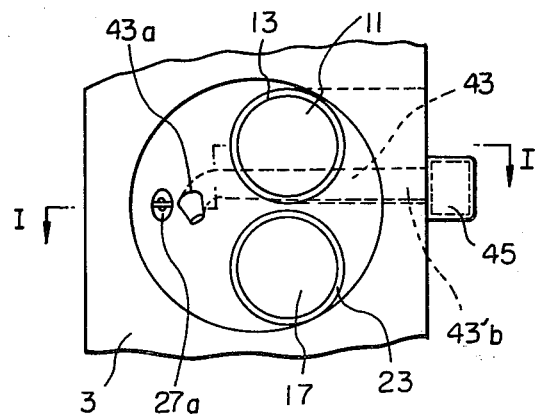
FIG. 2 is a view taken along line II—II in FIG. 1.

Referring to FIG. 1, a cylinder bore 2 and a recess 4 are formed in a cylinder block 1 and a cylinder head 3, respectively. The cylinder head 3 is secured to the cylinder block 1. The cylinder bore 2 has a piston 7 sealingly and reciprocatingly inserted therein. The space surrounded by the cylinder bore 2, the recess 4 and the piston 7, forms a combustion chamber which will be designated by the reference numeral 5 hereinafter. The combustion chamber 5 is communicated with an intake part (not shown). The intake port is communicated with a fuel supply device, such as a carburetor (not shown), via an intake valve 11 (FIG. 2), which is actuated in synchronism with the movement of a crankshaft (not shown) so as to cooperate with a valve seat 13, for controlling the introduction of a combustible gas mixture from the intake port into the combustion chamber 5 by the intake valve 11. The term "combustible gas mixture" includes not only the usual air-fuel mixture, but also a lean air-fuel mixture and a gas mixture containing recirculated exhaust gas therein. Referring to FIG. 1 again, the combustion chamber 5 is also communicated via an exhaust valve 17 with an exhaust port 15, which is in turn communicated with an exhaust pipe (not shown). A valve rod 19 connected to the exhaust valve 17 projects from the cylinder head 3, and the upper portion of the valve rod 19 is urged upwardly by means of a compression spring 21 disposed on the cylinder head 3 so that the exhaust valve 17 is in abutment with a valve seat 23. The valve rod 19 is pushed by a valve drive mechanism 25 which is operated in synchronism with the movement of the crankshaft (not shown) for operating the exhaust valve 17. A spark plug 27 having electrodes 27a is thread-secured to the surface of the combustion chamber 5.

A cavity 31, wherein an operating valve 37 is installed, is formed within the cylinder head 3, and a valve member 33 is tightly engaged within the cavity 31. A small hole 33a is formed within the valve member 33 in the axial direction of the valve member 33, and a valve rod 35 is sealingly and axially slidably inserted within the hole 33a. The operating valve 37 is fixed to the front end of the valve rod 35 for cooperating with a valve seat 33b formed on the valve member 33. More specifically, the upper end of the valve rod 35 is urged upwardly by a compression spring 39 so that the operating valve is in abutment with the valve seat 33b. In addition, the upper end of the valve rod 35 is pushed by a valve drive mechanism 41 which operates in synchronism with the movement of the crankshaft (not shown) so that the operating valve 37 is operated in accordance with a particular timing as will be explained later. A long hole 43 having a uniform cross-sectional shape, such as a circular shape or a rectangular shape, is mold-shaped within the cylinder head 3. One end 43a of the long hole 43 is opened at a position above the operating valve 37, and the other end 43b of the long hole 43 is opened to an outer wall of the cylinder head 3. The other end 43b of the long hole 43 is communicated with an accumulation gas chamber 45 having a predetermined volume. Thus, the long hole 43 and the accumulation gas chamber 45 form an accumulation chamber 47 having a passage for reciprocating the combustible gas mixture. The long hole 43 of the accumulation chamber 47 is disposed substantially in parallel with the exhaust port 15 and is so arranged and so shaped that heat in the exhaust gas passing through the exhaust port is transmitted to the long hole 43 from the peripheral wall of the exhaust port 15 through the cylinder head 3 thereby heating the combustible gas mixture in the long hole 43.

A cap 49 is disposed in a space which is present between the accumulation chamber 47 and the combustion chamber 5 on the combustion chamber side of the operating valve 37. The cap 49 comprises a cylindrical portion 49a and a round (i.e., hemispherical) portion 49b connected to the cylindrical portion. Furthermore, the cap 49 has one jet or a plurality of jets 49c (only one is illustrated in FIG. 1) formed on the round portion 49b. Thus, when the operating valve 37 is open, the combustible gas mixture accumulated in the accumulation chamber 47 spouts into the combustion chamber 5 through the jets 49c. It is preferable to arrange one of the jets 49c in such a way that it generates a swirl motion which sweeps off the electrodes 27a of the spark plug 27. As a result, the spark plug 27 facilitates the ignition of the combustible gas mixture. It is also preferable to select the sizes and directions of the other jets 49c so that a unidirectional swirl motion or approximately uniform turbulences can be generated approximately within the entire combustion chamber.

Figure 3:
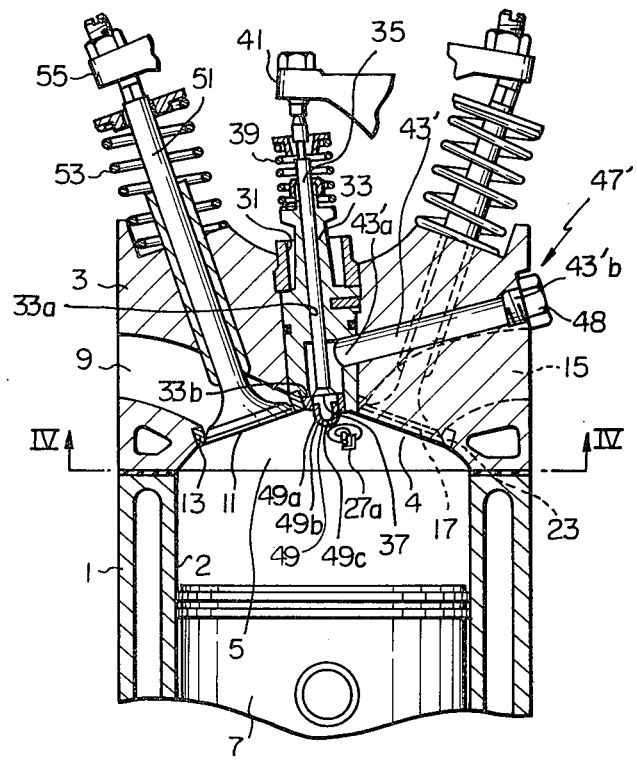
FIG. 3 is a cross-sectional elevational view of the second embodiment according to the present invention.
Figure 4:
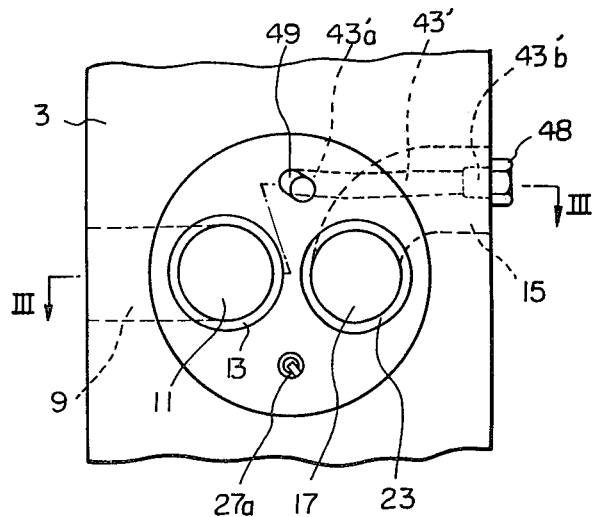
FIG. 4 is a view taken along line IV—IV in FIG. 3.

The second embodiment of the present invention will now be explained with reference to FIG. 3, which illustrates a cross-sectional elevational view of the second embodiment, and with reference to FIG. 4, which is a view taken along the line IV—IV in FIG. 3. The second embodiment is different from the first embodiment in terms of the positional relationship of the arrangement of the intake valve, the exhaust valve, the intake port and the exhaust port, the operating valve and the spark plug. Both ports are communicated with the combustion chamber via the valves, respectively. The second embodiment is also different from the first embodiment in terms of the structure of the accumulation chamber which is communicated with the operating valve. However, since the differences except for the structures of the accumulation chamber, the intake port and the valve drive mechanism of the intake valve are apparent from FIGS. 1 through 4, a further explantion of such differences is omitted here. In FIGS. 1 through 4, the same parts are designated by the same reference numerals. It should be pointed out that although the intake port 9 is not illustrated in FIGS. 1 and 2, the structure of the intake port has already been explained in detail in conjunction with the explanation of the first embodiment. The intake valve 11 is operated in synchronism with the movement of the crankshaft by means of a valve rod 51 connected to the intake valve 11, a compression spring 53 disposed onto the valve rod 51, and a valve drive mechanism 55 which operates the valve rod 51. The detailed structure and the operation of the intake valve are similar to those of the exhaust valve as has already been explained hereinbefore with reference to FIG. 1.

Referring to FIGS. 3 and 4, a long hole 43' having a uniform cross-sectional shape, such as a circular shape or a rectangular shape, is formed by a machine tool within the cylinder head 3. One end 43'a of the long hole 43' opens at a position above the operating valve 37, and the other end 43'b of the long hole 43' opens to the outer wall of the cylinder head 3. A tube plug 48 is screw-threaded to the other end 43'b of the long hole 43 to form an accumulation chamber 47'. The long hole 43' is disposed adjacent to the exhaust port 15 so that the long hole is heated by heat emitted from the exhaust gas and transmitted through the cylinder head 3.

Figure 5:
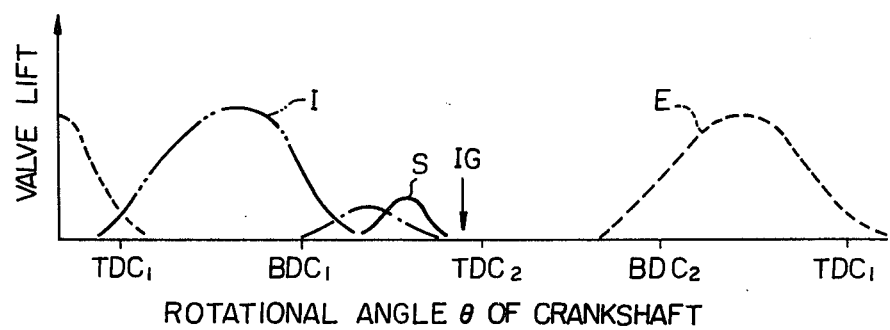
FIG. 5 is a valve operational diagram of the first or second embodiment.

The timing schedule for the valves mounted in the first and the second embodiments of the present invention will now be explained with reference to FIG. 5. In FIG. 5, a rotational angle $\theta$ of the crankshaft is plotted on the abscissa, and valve lifts of the intake valve 11, exhaust valve 17 and the operating valve 37 are plotted on the ordinate, and are designated by a two-dot and a dash line I, a broken line E and a solid line S, respectively. Immediately prior to the first top dead center ($TDC_1$) positioning of the piston, the intake valve 11 (FIGS. 2, 3 and 4) is opened, and then the intake stroke is commenced. After the first top dead center ($TDC_1$) positioning of the piston is completed, the exhaust valve 17 (FIGS. 1 through 4) is closed, and the combustible gas mixture is introduced and stored within the combustion chamber 5 (FIGS. 1 and 3). After the first bottom dead center ($BDC_1$) positioning of the piston is completed, the compression stroke is commenced, wherein the intake valve 11 (FIGS. 2, 3 and 4) is closed, and immediately thereafter the operating valve 37 (FIGS. 1 and 3) is opened. Since the combustible gas mixture, which has a pressure level higher than that at the moment immediately after the opening of the operating valve 37 (FIGS. 1 and 3), has been accumulated in the accumulation chamber 47 (FIG. 1) or 47' (FIG. 3), as will be described hereinafter, the high pressure combustible gas mixture spouts into the combustion chamber 5 (FIGS. 1 and 3) through the jets 49c of the cap 49 (FIGS. 1 and 3) when the operating valve 37 (FIGS. 1 and 3) is opened. One of the spouted jet flows sweeps off the electrodes 27a of the spark plug 27 (FIGS. 1 through 4). Due to the spouted jet flows, approximately uniform turbulences are generated within almost the entire area of the combustion chamber 5 (FIGS. 1 and 3). It is preferable that the cross-sectional area of the jets 49c of the cap 49 be smaller than that of the accumulation chamber 47 or 47' or the long hole 43 or 43', so that the intensity of the jet flows spouted from the jets 49c can be increased.

Since the accumulation chamber 47 or 47' is disposed adjacent to the exhaust port 15 and is heat exchangeable with the exhaust port 15, the combustible gas mixture which exhibits a high pressure level and which is accumulated within the accumulation chamber 47 or 47' is heated, and the atomization and vaporization of the fuel in the accumulated combustible gas mixture are increased. In addition, since the combustible gas mixture exhibiting a high pressure level within the accumulation chamber 47 or 47' is heated, the pressure of the combustible gas mixture in the accumulation chamber 47 or 47' is increased and not lowered due to the cooling by the wall of the accumulation chamber 47 or 47'.

In the first embodiment illustrated in FIGS. 1 and 3, the high pressure combustible gas mixture flows at a high speed in the long hole 43, which has a smaller cross-sectional area than the accumulation gas chamber 45, when the combustible gas mixture passes from the accumulation gas chamber 45 to the long hole 43. Due to the mechanical vibrating effect caused by the flow, the combustible gas mixture is further mixed, and the sizes of particles of the fuel contained in the combustible gas mixture are minimized. Such minimization of the fuel particles results in an increase of the total outer surface of the particles. Furthermore, the fuel particles are moved to a portion where the vapor pressure of the combustible gas mixture is low. As a result, the atomization of the fuel is increased.

In the second embodiment of the present invention illustrated in FIGS. 3 and 4, the combustible gas mixture also flows in the accumulation chamber 47', one end of which is closed by the tube plug 48. This flow is caused by pressure variation created when the operating valve 37 is open. Such pressure variation is reflected within the accumulation chamber 47' which is surrounded by the cylinder head 3 and the tube plug 48. As a result, the size minimization (or atomization) and vaporization of the fuel particles contained in the combustible gas mixture are increased, and the fuel is further mixed with air.

As mentioned above, the atomization and the vaporization of the combustible gas mixture are increased by heating the combustible gas mixture, and the pressure of the gas mixture is maintained at a high level by heating the combustible gas mixture. The mixing of the combustible gas mixture, the atomization and the vaporization of the fuel are further increased while the combustible gas mixture flows through the reciprocation passage of the accumulation chamber 47 or 47'. Accordingly, when the high pressure combustible gas mixture spouts into the combustion chamber 5 through the jets 49c of the cap 49, the combustible gas mixture in the combustion chamber 5 is easily ignited in the next burning stroke. Due to the synergistic results of the easy ignition and the swirl motion or turbulences generated by the spouted jets, the speed of the flame of the combustible gas mixture is increased and the combustible gas mixture is burnt steadily. As a result, the thermal efficiency of the engine is increased. Such increase of the thermal efficiency is especially apparent when the engine is cold.

As the piston 7 (FIGS. 1 and 3) is further raised, the pressure in the combustion chamber 5 (FIGS. 1 and 3) is increased rapidly. Then the combustible gas mixture at a high pressure level in the combustion chamber 5 (FIGS. 1 and 3) in turn enters into the accumulation chamber 47 (FIG. 1) or 47' (FIG. 3) through the jets 49c of the cap 49 and the space located in the proximity of the valve seat 33b and the operating valve 37 (FIGS. 1 and 3). In this instance, the combustible gas mixture flows at a high speed within the long hole 43 or 43', and the accumulation chamber 47 (FIG. 1) or 47' (FIG. 3) is filled with the combustible gas mixture. The combustible gas mixture is mixed, and then the atomization and the vaporization of the fuel are increased in a manner similar to that explained above. Just before the completion of the compression stroke, the operating valve 37 (FIGS. 1 and 3) is closed, and the combustible gas mixture at a high pressure level is accumulated within the accumulation chamber 47 (FIG. 1) or 47' (FIG. 3). Then, at the time designated by arrow $I_G$ in FIG. 5, a spark is ignited between the electrodes 27a of the spark plug 27 (FIGS. 1 and 3), and then the expansion stroke takes place. Prior to the second bottom dead center ($BDC_2$) positioning of the piston, the exhaust valve 17 (FIGS. 1 and 3) is opened, and the burnt gas in the combustion chamber 5 (FIGS. 1 and 3) is exhausted into the exhaust manifold (not shown) through the exhaust valve 17 (FIGS. 2 and 4) and the exhaust port 15 (FIGS. 1 and 3). The heat emitted from the exhaust gas passing through the exhaust port 15 is transmitted to the accumulation chamber 47 (FIG. 1) or 47' (FIG. 3) to heat the combustible gas mixture accumulated within the accumulated chamber 47 (FIG. 1) or 47' (FIG. 3).

As will be understood from the above description, in the engines illustrated in FIGS. 1 through 4, the high pressure combustible gas mixture, obtained approximately at the time of the completion of the compression stroke, is accumulated within the accumulation chamber 47 or 47'. Then the high pressure accumulated combustible gas mixture is spouted into the combustion chamber 5 from the accumulation chamber 47 or 47' approximately at the beginning of the compression stroke during the next cycle. As a result, uniform turbulences can be generated within the combustion chamber. In addition, the combustible gas mixture is ignited before the turbulences become weak. Consequently, the combustible gas mixture can be burnt steadily.

In a case where either the cross-sectional area of the jets 49c of the cap 49, the clearance between the operating valve 37 and the valve seat 33b, or the cross-sectional area of the long hole 43 or 43' is smaller than that of the embodiment 1 or 2 explained hereinbefore, a time lag may be caused between the time when the operating valve is open and the time when the desired swirl motion or turbulences are generated within the combustion chamber 5. To generate a swirl motion or turbulences at a desired time in the combustion chamber, as illustrated by a dot-dash line in FIG. 5, the operating valve 37 may be commenced to open at a time which is earlier than the times when the operating valves of the above-explained first and second embodiments are open, as illustrated by a solid line in FIG. 5.

Since in the present invention the high pressure combustible gas mixture during the last part of the compression stroke is accumulated within the accumulation chamber from the combustion chamber, the thermal energy in the accumulated combustible gas mixture can not be utilized for driving the engine during the expansion stroke occurring immediately after the compression stroke. However, since the accumulated combustible gas mixture is spouted into the combustion chamber at the beginning of the next compression stroke, the thermal energy in the accumulated gas mixture eventually will be utilized in the following expansion stroke for driving the engine. If the operating valve is opened during the last part of the intake stroke, the energy of the pressure in the accumulated combustible gas mixture can also be utilized for driving the engine. It should be pointed out that even if the operating valve 37 is opened early, as illustrated by the dot-dash line in FIG. 5, the combustible gas mixture accumulated in the accumulation chamber 47 or 47' will also be spouted into the combustion chamber at the beginning of the compression stroke because the cross-sectional area of the passage communicating the accumulation chamber 47 or 47' and the combustion chamber 5 is small. Consequently, a long time is required to spout the entire amount of the accumulated combustible gas mixture. Since the operating valve 37 can remain open for a long time interval, the design and the manufacture of the cam which operates the valve drive mechanism of the operating valve 37 are simplified, and the durability of the cam is increased; thus constituting auxiliary advantages of the present invention.

The volume of each of the accumulation chamber 47 and 47' and the size of each of the passages for reciprocation 43 and 43' of the first and the second embodiments illustrated in FIGS. 1 through 4 can be determined on the basis of the volume of the combustion chamber and the operating characteristics of the engine, such as the rotating speed of the engine. For example, the inventors of the present invention obtained very preferable results when the diameter of each of the long holes 43 and 43' was between 6 and 10 mm, the length thereof was between 80 and 100 mm and the shape thereof was circular.

Figure 6:
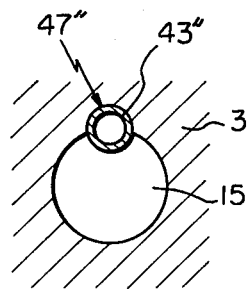
FIGS. 6 and 7 are enlarged cross-sectional views of different embodiments of accumulation chambers.
Figure 7:
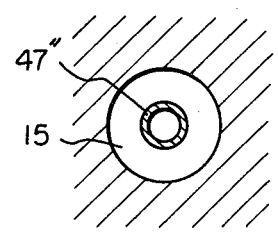

The structure of the accumulation chamber of the present invention is not limited to that of the first or the second embodiment, but can be altered as long as the accumulation chamber is heat exchangeable with the exhaust port. In some cases, the accumulation chamber may not have any long hole. In some cases, a part of or approximately the entire part of the accumulation chamber may be disposed within the exhaust port. For example, as illustrated in FIG. 6, the accumulation chamber 47" may be constructed with a circular tube 43", and a part of the wall of the circular tube 43" may be exposed to the exhaust port 15 which is formed within the cylinder head 3. As illustrated in FIG. 7, in another embodiment, the accumulation chamber 47'" and the exhaust port 15 may be disposed concentrically.

The above explanation has been presented with regard to a gasoline engine of a four-stroke cycle type; however, the present invention is also applicable to a diesel engine of a four-stroke cycle type. If this is the case, since air is introduced into the combustion chamber through the intake valve in a diesel engine, the compressed air is accumulated in the accumulation chamber, and then heated by heat transmitted from the exhaust port. As a result, the pressure of the accumulated air is increased and the accumulated air spouts into the combustion chamber when the operating valve is open, thereby creating a strong swirl motion or uniform turbulences.

In the present invention, since an accumulation chamber which is heat exchangeable with an exhaust port is disposed at a position adjacent to the exhaust port, the combustible gas mixture accumulated within the accumulation chamber is heated, and advantages are achieved by the swirl motion or turbulences generated by the jets spouted into the combustion chamber at the beginning of the compression stroke. Since such turbulences are maintained until the compressed intake gas mixture is ignited just after the compression stroke, the flame speed of the combustible gas mixture is increased. As a result, even when a combustible gas mixture which contains a large amount of recirculated exhaust gas therein or a lean air-fuel mixture is used in the engine, the flame speed is increased and the thermal efficiency of the engine is increased. Furthermore, fluctuations of the engine caused by changes in burning velocities between cycles can be reduced. Accordingly, a reduction of harmful contaminants in the exhaust gas emitted from the engine by utilizing a combustible gas mixture which contains a recirculated exhaust gas or a lean air-fuel mixture, an increase of the thermal efficiency of the engine and an increase of the operating stability of the engine can be simultaneously achieved in the present invention.

What we claim is:
1. An internal combustion engine with an accumulation chamber, which engine comprises:

a cylinder block having a cylindrical bore formed therein for constituting a part of a combustion chamber in which a piston is reciprocated and a combustible gas mixture is burnt to generate engine power;

a cylinder head secured to said cylinder block, which head has formed therein a recess constituting the other part of said combustion chamber, an intake port for introduction of combustible gas, an exhaust port for removal of exhaust gas, a cavity constituting at least part of an outwardly closed accumulation chamber for temporarily accumulating a part of the combustible gas introduced into said combustion chamber, and a passage between the combustion chamber and the accumulation chamber;

a valve positioned in said passage for controlling communication between said combustion chamber and said accumulation chamber; and means for opening said valve only once per engine cycle approximately at the time a compression stroke of said piston is commenced and for shutting said valve prior to ignition in the combustion chamber approximately at the time said compression stroke is completed, so that combustible gas under high pressure within said combustion chamber at the completion of said compression stroke is accumulated within said accumulation chamber and that said accumulated combustible gas is spouted into said combustion chamber at the beginning of the next compression stroke; wherein said accumulation chamber is disposed in a heat exchange relation with exhaust gases of the engine only adjacent to the exhaust port in the cylinder head so that heat from exhaust gases flowing through said exhaust port can be transferred to the accumulated intake gas.

2. An internal combustion engine according to claim 1, wherein said accumulation chamber has a passage for reciprocating said intake gas therein, said passage for reciprocation being disposed substantially in parallel with said exhaust port, whereby said intake gas introduced within said passage for reciprocation is heated by heat transmitted from said exhaust port and whereby said intake gas is flowed at a high speed within said passage for reciprocation when said intake gas flows into or flows from said accumulation chamber.

3. An internal combustion engine according to claim 2, wherein said accumulation chamber comprises said passage for reciprocation, said passage extending a certain length in a lengthwise direction and having a uniform cross section when it is cross-sectioned at several positions along the lengthwise direction thereof, and a gas accumulation chamber having a certain volume.

4. An internal combustion engine according to claim 2, wherein said accumulation chamber consists of said passage, said passage extending a certain length in a lengthwise direction and having a uniform cross section when it is cross-sectioned at several positions along the lengthwise direction thereof.

* * * * *